Figure 1:
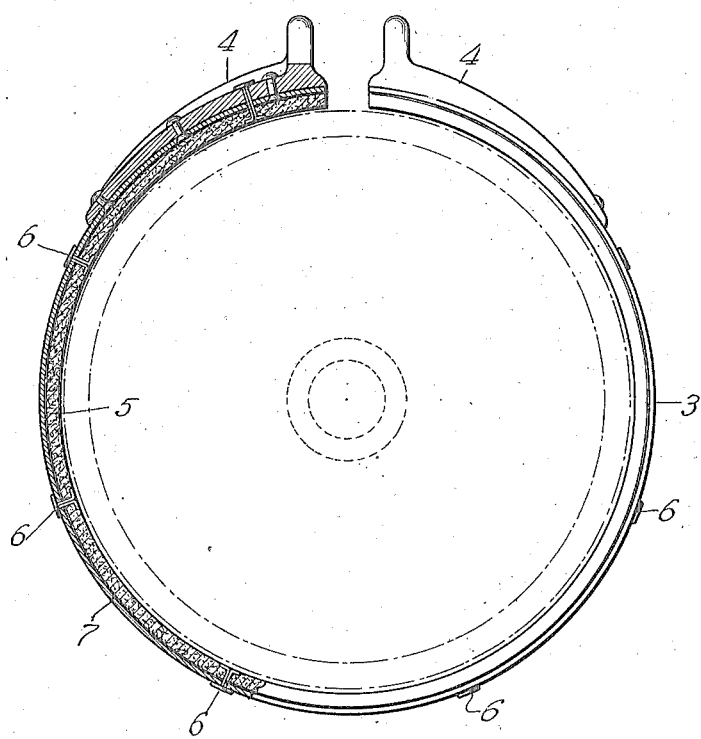

J. H. SARIS.
BRAKE OR CLUTCH LINING.
APPLICATION FILED AUG. 16, 1920. RENEWED OCT. 28, 1921.

1,416,979.  
Patented May 23, 1922.

UNITED STATES PATENT OFFICE.

JOSEPH H. SARIS, OF BELOIT, WISCONSIN.

BRAKE OR CLUTCH LINING.

1,416,979.  Specification of Letters Patent.  Patented May 23, 1922.

Application filed August 16, 1920, Serial No. 403,929. Renewed October 28, 1921. Serial No. 511,108.

*To all whom it may concern:*

Be it known that I, JOSEPH H. SARIS, a citizen of the United States, residing at Beloit, county of Rock, and State of Wisconsin, have invented certain new and useful Improvements in Brake or Clutch Linings, of which the following is a specification.

This invention relates in general to friction devices, and has more particular reference to a band or strip of material adapted for use as a lining for brake or clutch bands.

Linings of the general character indicated are used extensively in automobile construction, where they are subjected to very heavy service, and in some types of cars, the linings are required to operate in an oil bath and furthermore, in use are subjected to excessive heat, which is generated by the friction of the applied brake or clutch. The fabric linings which have heretofore been used to a considerable extent are unreliable and unsatisfactory for the reason that their braking surfaces soon become hard and glazed as the result of charring by the generated heat, and by reason of their continual subjection to oil.

A lining possessing advantageous characteristics over the ordinary fabric lining is disclosed in my prior Patent, #1,184,701 granted May 23, 1916, and while these linings have been very extensively used with satisfactory results, they are expensive to manufacture because of the numerous operations necessary in their production and furthermore, the cork surfaces are incapable in this construction of utilization throughout the full width of the lining since sufficient fabric must be left in each side of the cork inserts to retain them in position.

One of the primary objects of my present invention is to provide a lining which will possess all of the advantages inherent in the use of cork as a friction braking surface, and in which the cork will be distributed throughout the entire width of the lining.

Another object is to provide a lining which will be of homogeneous structure; one which will present a braking or friction surface of great strength and durability; one which will not be deteriorated or affected by heat or oil, and one which can be economically manufactured and which will be highly efficient in use.

Other objects and many of the attendant advantages of my invention will be readily appreciated as the same becomes better understood by reference to the following description when considered in connection with the accompanying drawings.

Figure 2:
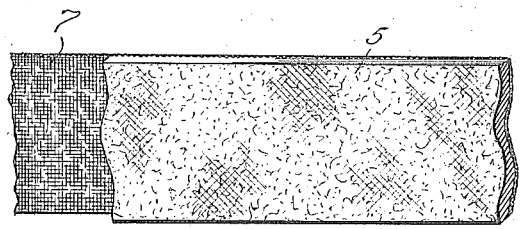

Referring to the drawings:

Fig. 1 is a side view partially in section of a brake lining embodying my invention, applied to a brake or clutch band of well known construction; and Fig. 2 is a fragmentary view looking at the inner face and one edge of the lining.

The band to which I have shown my lining as applied comprises a circular metallic band 3, equipped adjacent its ends with brackets 4, adapted to be operated in the usual manner. The lining embodying my invention is designated by reference character 5, and is formed of a width and length to fit the interior of the band 3, to which it is secured at intervals by rivets 6 extending through the band and the lining as shown.

The lining itself is a composition, composed of ground cork which affords a desirable yielding braking surface, fibrous material which imparts tensile strength and rigidity to the lining and presents a practically non-compressible braking surface which co-operates with the yielding braking surface presented by the cork, and a binder which is not affected by either heat or oil and which thoroughly binds the fibrous material and the cork into a homogeneous structure.

The fibrous material which I employ may be of any desired character, but for purposes of economy, I prefer to employ cotton waste, which appears to possess all of the characteristics desirable for this purpose. This waste is first throughly shredded or macerated, whereupon it is mixed with granulated cork until the cork and waste are throughly intermixed, whereupon an adhesive liquid binder is added and thoroughly mixed with the cork and fibrous material until a homogeneous plastic mass is produced.

While any suitable binder which possesses the requisite heat and oil resisting properties and which will tenaciously bind the cork and fibrous material together, may be employed, I have found that an albuminous binder and preferably, blood albumin, is well suited for the purpose.

After the binder, the fibrous material and the granulated cork have been thoroughly intermixed into a homogeneous plastic mass, this mass is first partially dried and then put in molds, where it is subjected to high pressure and simultaneously further heated to dry it. The molds are so shaped that the mass will be pressed into a flat sheet or strip, the width of which will, of course, depend upon the width of the mold. While each lining may be made in an independent mold which is of the length and width of the desired completed lining, I have found it cheaper to form a sheet equal in length to the desired lining, but several times the width of each lining, this sheet being subsequently cut lengthwise into strips of lining of the desired width.

While the lining made as above described may be used without any backing or binding sheet, I have found it preferable to employ in connection with the composition, a backing consisting of a suitable fabric which serves to hold the composition together and prevent it from cracking or breaking as the result of undue bending in handling or shipping. This fabric backing indicated on the drawings by reference character 7 is placed in the bottom of the mould before the composition is deposited therein and as the result of the pressure to which the mould contents are subjected, the fabric adheres tightly and becomes bonded to the composition so as to form a protective backing which strengthens the lining and precludes fractures thereof.

After being compressed and dried the requisite amount, the lining proper consists of a compact homogeneous mass of intermixed fibrous material and granulated cork, which are held and firmly bound together by the albuminous binder. In use the composite braking surface presented by the cork and the fibre gives a smooth braking action without grabbing or chattering and since the lining is not deteriorated or affected by either heat or oil, and does not char or become hard and glossy, as fabric linings do, it will produce a uniform and velvety braking action for a long period of time, and in fact, until the lining is practically worn through.

It is believed that my invention and its attendant advantages will be understood from the foregoing without further description, but it should be manifest that the character and proportions of the materials employed may be varied within considerable limits without departing from the essence of the invention as defined in the following claims.

I claim:

1. A brake or clutch lining, comprising a composition sheet or strip including fibrous material, granulated cork, and a heat and oil resisting binder.

2. A brake or clutch lining, composed of fibrous material, granulated cork, and a binder having heat and oil resisting properties, all thoroughly intermingled and compressed into a homogeneous strip.

3. A brake or clutch lining, comprising a composition of fibrous material, granulated cork, and an albuminous binder intermixed and compressed into a homogeneous strip or sheet.

4. A brake or clutch lining, consisting of a strip of composition, comprising fibrous material, granulated cork, and an albuminous binder whereby the fibrous material and cork are bound together into a homogeneous mass.

5. A brake or clutch lining, consisting of a strip of homogeneous composition, comprising cotton waste, granulated cork, and blood albumin thoroughly intermixed and compressed.

6. A brake or clutch lining, composed of fibrous material, granulated cork, a binder having heat and oil resisting properties, all thoroughly intermingled and compressed into a homogeneous strip, and a fabric backing.

7. A brake or clutch lining, composed of fibrous material, granulated cork, a binder having heat and oil resisting properties all thoroughly intermingled and compressed into a homogeneous strip, and a sheet of textile material bonded to one face of said strip.

8. A composition, adapted for use as a brake or clutch lining comprising fibrous material, a compressible material in granulated form, and a binder whereby said materials are bound together.

9. A composition, adapted for use as brake or clutch lining, comprising fibrous material, and compressible material mixed together and united by a binder.

10. A composition, adapted for use as brake or clutch lining, comprising fibrous material, and compressible material mixed together and united by a heat resisting binder.

11. A composition, adapted for use as brake or clutch lining, comprising fibrous material, and compressible material mixed together and united by an oil resisting binder.

12. A composition, adapted for use as brake or clutch lining, comprising fibrous material, granular material, and a binder all mixed and compressed into a homogeneous mass.

JOSEPH H. SARIS.